United States Patent [19]

Hashimoto et al.

[11] 4,006,979

[45] Feb. 8, 1977

[54] ELECTROMAGNETIC RELEASE DEVICE FOR A MOTION PICTURE CAMERA

[75] Inventors: Teiji Hashimoto, Kawasaki; Tomoshi Takigawa, Machida; Toshikazu Ichiyanagi, Tokyo, all of Japan

[73] Assignee: Canon Kabushiki Kaisha, Tokyo, Japan

[22] Filed: Jan. 10, 1974

[21] Appl. No.: 432,247

[30] Foreign Application Priority Data

Jan. 17, 1973 Japan .............................. 48-7670

[52] U.S. Cl. ............................. 352/176; 352/169; 352/174

[51] Int. Cl.² ......................................... G03B 1/00

[58] Field of Search .......... 352/174, 175, 176, 177, 352/178, 179, 169

[56] References Cited

UNITED STATES PATENTS

| | | | |
|---|---|---|---|
| 3,601,481 | 8/1971 | Kessler | 352/169 |
| 3,602,584 | 8/1971 | Anderl | 352/174 |
| 3,603,678 | 9/1971 | Anderl | 352/169 |
| 3,790,264 | 2/1974 | Heinrich | 352/174 |

Primary Examiner—Monroe H. Hayes
Attorney, Agent, or Firm—William R. Woodward

[57] ABSTRACT

An electromagnet release device for a motion picture camera having a drive motor, a shutter control member actuated by the driving force of the motor, a blocking mechanism to selectively block the actuation of the shutter control member, an electromagnet member to control the actuation of the blocking mechanism and a release control switching member with a delay circuit having a charging circuit that delays, for a predetermined time, the timing of the actuation of the motor relative to the timing of the actuation of the electromagnet and a discharging circuit to keep the motor energized for a period after the electromagnet is released to assure the driving of the shutter to the proper stop position. Circuits are also shown for reducing magnet current during continuous operation and for timing the operated period of the electromagnet in single frame operation.

12 Claims, 8 Drawing Figures

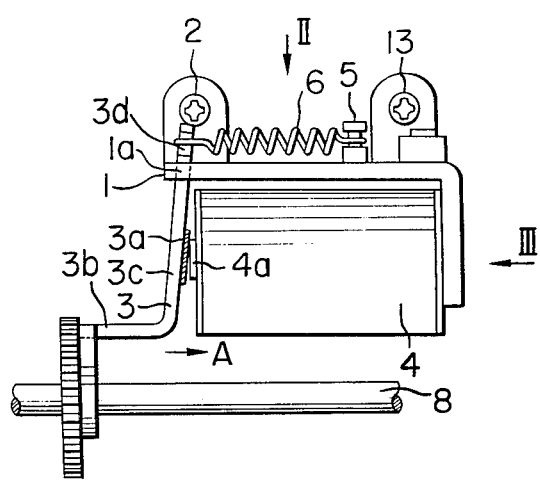
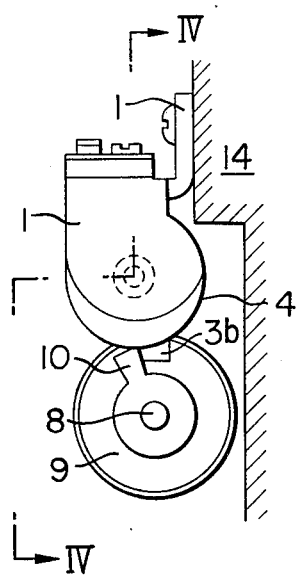
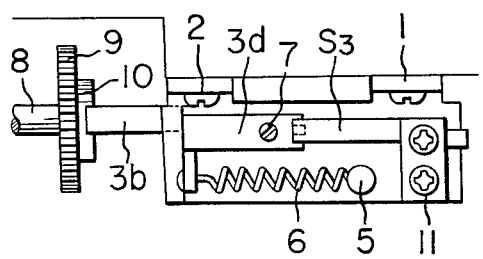
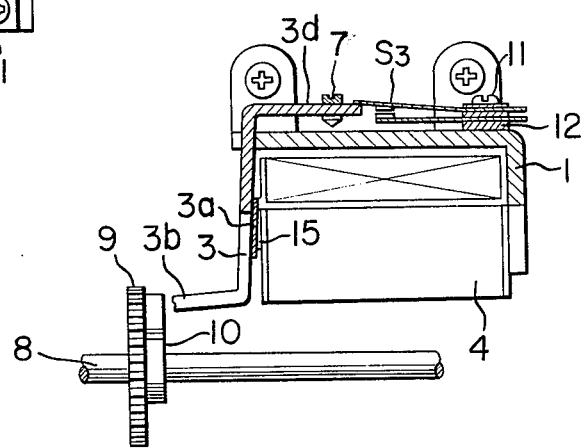

ELECTROMAGNETIC RELEASE DEVICE FOR A MOTION PICTURE CAMERA

BACKGROUND OF THE INVENTION

1. Field of the Invention

This invention relates to an electromagnetic release device for a motion picture camera, and more particularly to such a device which ensures the shutter of the camera to be stopped at a predetermined position when depression of a camera's shutter release member is released to cut off the power supply to a shutter drive motor.

2. Description of the Prior Art

Heretofore, an electromagnetic release device for a motion picture camera has been designed such that when depression of the shutter release member is released, a power supply circuit to the shutter drive motor is opened and at the same time, a shutter stop member is driven by electromagnetic means for engagement with a shutter blade shaft driven by the shutter drive motor to thereby block the rotation of the shutter blade shaft and stop the shutter at a predetermined position.

In such design, however, the shutter drive motor continues to revolve only from its own inertia force after the power supply circuit to the shutter drive motor has been opened, and this has often prevented the shutter blade shaft from being rotated fully to its predetermined rest position, with a result that the shutter is stopped while being still left open.

Also, when picture-taking is started by depression of the shutter release member, power supply to the shutter drive motor starts simultaneously with the initiation of unlocking of the stop mechanism comprising the shutter stop member, the shutter blade shaft, etc., that is, immaturely before the lock of such mechanism is completely released, and this has frequently resulted in an overcurrent flowing to the motor.

SUMMARY OF THE INVENTION

It is an object of the present invention to eliminate all the above-noted disadvantages that have existed in the prior art.

It is another object of the present invention to provide an electromagnetic release device for a motion picture camera which permits the drive motor to be supplied with power for a predetermined time after the shutter stop member has been driven, to thereby continue the revolution of the motor to ensure the shutter to be stopped at a predetermined position and which, during initiation of picture-taking, permits power supply to the shutter drive motor only after the stop mechanism has been completely unlocked, to thereby prevent any overcurrent from flowing to the drive motor, and in particular to provide a delay circuit controlling one of these operations in a charging phase and the other in a discharging phase.

Other objects of the present invention will become apparent from the following detailed description taken in conjunction with the accompanying drawings.

BRIEF DESCRIPTION OF THE DRAWINGS

FIG. 5 is a front view showing the mechanical construction of the shutter stop mechanism in the electromagnetic release device for a motion picture camera according to the present invention.

FIG. 6 is a plan view taken in the direction of arrow II in FIG. 5.

FIG. 7 is a right-hand side view taken in the direction of arrow III in FIG. 5.

FIG. 8 is a vertical cross-section taken along line IV—IV in FIG. 7.

DESCRIPTION OF THE PREFERRED EMBODIMENTS

Figure 1:
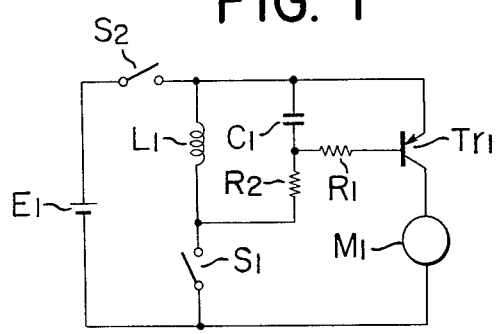
FIG. 1 diagrammatically shows an embodiment of the electric circuit which is applicable to the electromagnetic release device for a motion picture camera according to the present invention.

According to the present invention, an electromagnetic release device for a motion picture camera essentially comprises first switching means for closing and opening a drive circuit for electromagnetic means, second switching means for closing and opening a power supply circuit to a shutter drive motor for rotating a shutter blade shaft, delay means connected between said first and said second switching means, and a stop mechanism provided with a stop member actuated by the electromagnetic force of said electromagnetic means for stopping the rotation of the shutter blade shaft at a predetermined rest position, whereby supply and cut-off of the power to the second switching means may be delayed by the delay means for a predetermined time with respect to the operation of the first switching means.

Referring first to FIGS. 5 to 8, there is shown a shutter stop mechanism applicable to the electromagnetic release device for a motion picture camera according to the present invention. A yoke 1 has a spring-engaging pin 5 studded therein and is mounted to the camera body by means of screws 13. The yoke 1 holds an electromagnet 4 with an iron core 4a as its axis. A crank-like armature 3 is loosely received for rocking movement in a slot 1a formed through the yoke 1 and comprises a stop portion 3b, an intermediate portion 3c and an end portion 3d. The intermediate portion 3c is provided with a spacer 3a. A spring 6 is secured at one end to the spring-engaging pin 5 and at the other end to a spring-engaging hole 3d formed in the end of the armature 3, and normally biases the armature 3 for counter-clockwise rotation about the slot 1a of the yoke 1. A shaft 8 for rotating a shutter blade (not shown) has mounted thereon a gear 9 rotatable with the shutter blade at a speed ratio of 1:1, and a stop member having a stop cam 10 formed integrally therewith and engageable with the stop portion 3b when the shutter is stopped. A switch S3 is provided and adapted to be closed during engagement between stop portion 3b and the stop cam 10 and to be opened during such engagement. The stop mechanism so constructed is applicable to any of some embodiments of electric circuit which will hereinafter be described.

FIG. 1 shows an embodiment of the electric circuit which is applicable to the electromagnetic release device for a motion picture camera according to the present invention. The above-described shutter stop mechanism is controlled by such circuit.

The circuit shown includes a release switch S1 constituting first switching means, a main switch S2, an exciting coil L1 for exciting the aforesaid electromagnet 4, a capacitor C1 constituting delay means, resistors R1 and R2, a shutter drive motor M1, a transistor Tr1 constituting second switching means for switching on and off the power supply circuit to the motor M1, and a power source E1.

Operation of the thus constructed electromagnetic release device for a motion picture camera will now be described. When the main switch S2 is first closed and then the release switch S1 closed, a current flows to the exciting coil L1 which excites the electromagnet 4. When the electromagnet 4 is so excited, the magnetic force thereof rocks the armature 3, against the force of the spring 6, in the direction of arrow A in FIG. 5, whereby the end 3b of the armature is retracted out of the path of rotation of the stop cam 10, thus releasing the stop portion 3b from engagement with the stop cam 10 (FIG. 10). On the other hand, the closing of the main switch S2 and of the release switch S1 has initially caused the capacitor C1 to be charged and therefore, when this occurs, the transistor Tr1 is in OFF state to maintain the motor M1 unenergized, but since the capacitor C1 in use is selected such that it is completely charged by the time when the disengagement of the stop portion 3b from the stop cam 10 occurs, the disengagement between the stop portion 3b and the stop cam 10 is immediately followed by turn-on of the transistor Tr1, which thus connects power supply to the shutter drive motor M1 which in turn drives the shutter shaft 8 for rotation. Thus, picture-taking is started.

When the release switch S1 is opened at the end of the picture-taking, the current flowing to the exciting coil L1 is cut off to deenergize the electromagnet 4 and thus, the armature 3 is rocked by the force of the spring 6 in the direction opposite to the direction of arrow A in FIG. 5, so that the stop portion 3b moves into the path of rotation of the stop cam 10.

On the other hand, even after the opening of the release switch S1, the transistor Tr1 remains in its ON state for a predetermined time until the current stored in the capacitor C1 has been discharged therefrom, so that the motor M1 still continues to revolve. Only after the stop cam 10 is engaged by the stop portion 3b of the armature 3 which has moved into the path of rotation of the stop cam 10, the discharge of the capacitor C1 is completed to turn off the transistor Tr1 and cut off the power supply to the drive motor M1, whereupon the motor is deenergized.

Thus, according to the present invention, deenergization of the drive motor M1 occurs only after the engagement between the stop cam 10 and the stop portion 3b of the armature 3 has taken place at a predetermined position, and this ensures the shutter to be stopped at a predetermined position.

This is equally true of single-frame photography and continuous photography.

Figure 2:
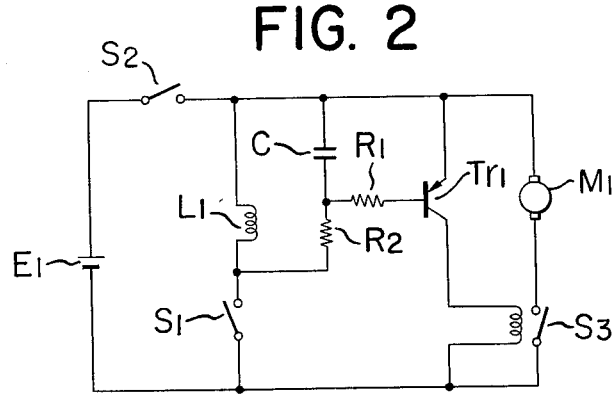
FIG. 2 diagrammatically shows another embodiment of the electric circuit which is applicable to the electromagnetic release device for a motion picture camera according to the present invention.

FIG. 2 shows an embodiment improved over that of FIG. 1. In this embodiment, a relay switch S3 is inserted behind the transistor Tr1 in the electric circuit of FIG. 1 so as to prevent any power loss from occurring between the emitter and collector of the transistor in the circuit of FIG. 1. In FIG. 2, similar reference characters designate elements which are similar in function and operation to those shown in FIG. 1.

Figure 3:
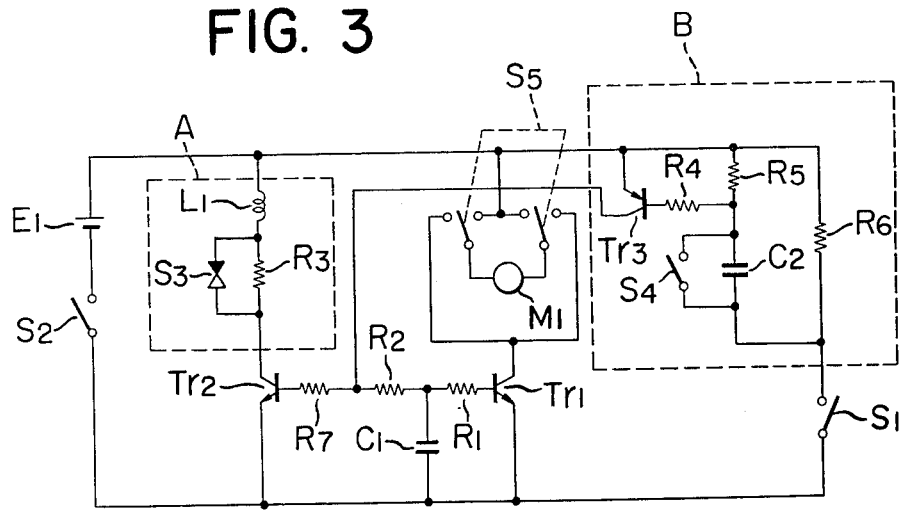
FIG. 3 diagrammatically shows still another embodiment of the electric circuit which is applicable to the electromagnetic release device for a motion picture camera according to the present invention.

Referring now to FIG. 3, there is shown a further embodiment which is additionally provided with a circuit for changing over the electromagnetic release device of the present invention between single-frame photography and continuous photography and a circuit for limiting the holding current of the electromagnet 4 during picture-taking. Again in FIG. 3, elements corresponding to those shown in FIG. 1 are given similar reference characters. M1 is the shutter drive motor; S5 is a change-over switch for changing over the direction of revolution of the motor M1; Tr1 is a transistor as the second switching means for closing and opening the power supply circuit to the motor M1; S1 and S2 designate a release switch and a main switch, respectively; R1 and R2 are resistors; and C1 is a capacitor which is delay means. These elements constitute a delay circuit. Tr2 is a transistor as the first switching means for closing and opening the drive circuit for the electromagnet 4; R7 is a resistor connected to the base of the transistor Tr2; L1 is a drive coil; R3 is a resistor; S3 is a normally closed switch mechanically actuated by the electromagnet 4 adapted to be opened only when the electromagnet 4 is substantially in its operated position; the portion encircled by dotted line A is a circuit so designed as to limit the current during picture-taking, i.e. during energization of the electromagnet 4; Tr3 is a transistor; R4, R5 and R6 are resistors; C2 is a capacitor which is a delay means; S4 is a manually operated switch which is to be opened for single-frame photography and closed for continuous photography; and the portion encircled by dotted line B is a circuit so designed as to change over the operation mode between single-frame photography and continuous photography. This circuit serves to turn on the transistor Tr3 when the switch S4 is in its OFF position, i.e. for a period of time required to advance the film by one frame during single-frame photography.

Operation of the construction shown in FIG. 3 and FIGS. 5–8 will now be described. It is assumed that the switch S4 has been closed to effect continuous photography. When the main switch S2 and the release switch S1 are closed successively as in the embodiment of FIG. 1, a current flows through R4–S4 to the base of the transistor Tr3, which is thus turned on. As a result, the transistor Tr2 is turned on to pass a heavy current through L1-S3-Tr2 to the drive coil L1, by which the electromagnet 4 is excited to rock the armature 3, against the force of the spring 6, in the direction of arrow A to retract the stop portion 3b of the armature out of the path of rotation of the stop cam 10, thereby unlock the stop mechanism as in the described embodiment of FIG. 1 (see FIG. 8). The rocking of the armature 3 in the direction of arrow A also causes the engagement of the stop portion 3b of the armature 3 with the switch S3, and the switch S3 is opened at the end of the rocking of the armature 3, i.e. in the position where the spacer 3a attached to the armature 3 is in intimate contact with the iron core 4a. Consequently, the current in the drive coil L1 flows through L1-R3-Tr2 so that it is limited by the resistor R3. On the other hand, the transistor Tr1 is turned on by the action of the delay circuit after unlocking of the stop mechanism, as described with respect to the embodiment of FIG. 1. Consequently, the shutter drive motor M1 is energized to rotate an unshown shutter blade, thus starting the picture-taking. Upon termination of the picture-taking, the release switch S1 is opened to cut off the base current of the transistor Tr3, which is thereby turned off.

As a result, the base potential of the transistor Tr2 drops to turn off this transistor. Thereafter, the shutter is stopped at its predetermined position in the same manner as described with respect to the embodiment of FIG. 1 (see FIG. 5).

Subsequently, when the switch S4 is opened and two main and release switches S2 and S1 closed to effect single-frame photography, the picture-taking is started in the same process as described with respect to the continuous photography. In this case, however, the capacitor C2 continues to be charged through the resistor R4 and R5 even if the release switch S1 is continuedly closed, so that the transistor Tr3 is turned off only after the film has been advanced by one frame. As a result, the transistor Tr2 is also turned off to stop the shutter at its predetermined position as described previously, thus terminating the single-frame photography.

Figure 4:
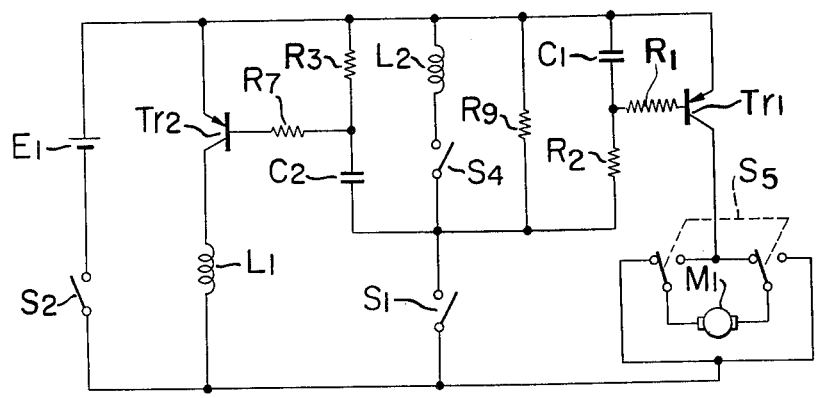
FIG. 4 diagrammatically shows a further embodiment of the electric circuit which is applicable to the electromagnetic release device for a motion picture camera according to the present invention.

FIG. 4 shows a further embodiment of the electromagnetic release device according to the present invention which again is additionally provided with a circuit for changing over the operation mode between single-frame photography and continuous photography and a circuit for limiting the holding current of the electromagnet 4 during picture-taking.

In FIG. 4, M1 is a shutter drive motor; S5 is a changeover switch for changing over the direction of revolution of the motor M1; Tr1 is a transistor as the second switching means for closing and opening the power supply circuit to the motor M1; S1 and S2 are a release and a main switch, respectively; R4 and R9 are resistors; and C1 is a capacitor which is delay means. These constitute a delay circuit.

L1 and L2 are exciting coils for exciting the electromagnet 4 shown in FIGS. 5–8; Tr2 is a transistor as the first switching means for energizing and deenergizing the exciting coil L1; R7 is a resistor connected to the base of the transistor Tr2; and S4 is a manually operated switch which is to be opened for single-frame photography and closed for continuous photography.

Description will now be made of operation of the electromagnetic release device according to the present invention as shown in FIG. 4 and FIGS. 5–8.

It is assumed that the switch S4 has been closed to effect continuous photography. When the main switch S2 and the release switch S1 are closed successively as in the embodiment of FIG. 1, a current flows through S4–S1 to the exciting coil L2, which is thus energized but the energization of this coil is not sufficient to cause the electromagnet 4 to attract the armature 3. On the other hand, there is a charging current flowing through RZ-R7 to the base of the transistor Tr2, which is thereby turned on. As a result, the transistor Tr2 is also turned on to pass a heavy current to the exciting coil L1, which is thus energized sufficiently to cause the electromagnet 4 to attract the armature 3. Thus, the electromagnet 4 rocks the armature 3 in the direction of arrow A against the force of the spring 6, so that the stop portion 3b, of the armature 3 is retracted out of the path of rotation of the stop cam 10, thus unlocking the shutter stop mechanism in the same manner as described with respect to the embodiment of FIG. 1 (see FIG. 8). By the time when the shutter stop mechanism is unlocked, the capacitor C2 has been completely charged to turn off the transistor Tr2 and cut off the power supply to the exciting coil L1, which is thus deenergized. However, independently of this deenergization of the coil L1, there is a current still flowing through the switches S4-S1 to the other exciting coil L2, which thus maintains the electromagnet 4 energized sufficiently to attract the armature 3.

On the other hand, the transistor Tr1 is turned on after unlocking of the stop mechanism by the action of the capacitor C1, as noted above with respect to the embodiment of FIG. 1. As soon as this transistor Tr1 is turned on, the shutter drive motor M1 is energized to drive the unshown shutter blade, thus starting the continuous photography.

When the release switch S1 is opened at the end of the picture-taking, the current from the source E1 to the coil L2 and to the base of the transistor Tr1 is cut off. When the power supply to the coil 2 is cut off, the electromagnet 4 becomes entirely deenergized to permit the armature 3 to be rocked back by the force of the spring 6 in the direction opposite to the direction of arrow A, so that the stop portion 3b of the armature moves into the path of rotation of the stop cam 10 and engages the cam 10 at a predetermined position. On the other hand, the motor M1 continues to revolve for a short time with the aid of the charge stored in the capacitor C1 producing a discharge current through the base of Tr1 keeping Tr1 turned on. The motor is deenergized by Tr1 turning off only after the stop cam 10 has been engaged by the stop portion 3b at a predetermined position. This ensures the shutter shaft 8 to be stopped at its predetermined position (see FIG. 5).

Subsequently, when the switch S4 is opened and two main and release switches S2 and S1 closed to effect single-frame photography, the picture-taking starts in the same process as described with respect to the aforesaid continuous photography. In this case, however, when the capacitor C2 is charged Tr2 is turned off even if the switch S1 is continuedly closed. The transistor Tr2 is turned off, however, only after the film has been advanced by one frame. The motor continues to be energized as Tr1 is still turned on. Consequently, the shutter is stopped at its predetermined position to complete the single-frame photography in the same manner as noted with respect to the embodiment of FIG. 3. except that FIG. 3 has the advantage that continuous actuation of release switch S1 does not keep the motor energized after the shutter is stopped.

Thus, with the electromagnetic release device for a motion picture camera according to the present invention, power supply to the shutter drive motor M1 takes place only after the stop mechanism has been unlocked and this prevents any overcurrent from flowing to the drive motor M1 to damage it as was experienced with the prior art electromagnetic release device of this type, and moreover reduces the consumption of the battery and accordingly increases its service life. Further, the fact that the shutter is ensured to stop at its predetermined position leads to the prevention of such accident as inadvertent exposure of the film.

We claim:

1. A release arrangement for a photographic camera operably by means of an electric current source, comprising:
 a motor for operating said camera;
 a shutter means operated by the driving force of the motor;
 a release means blocking the operation of said shutter means, and including:

1. blocking means, a part of which is capable of selectively shifting into and out of a movable region of said shutter means; and
2. an electromagnet means for controlling and shifting of said blocking means; and delay means for delaying the timing of current flow through said motor for a predetermined time relative to the timing of the operation of the electromagnetic means, said delay means comprising:
1. an electronic switching circuit for controlling the starting and stopping of said motor, said circuit having a transistor circuit including an output circuit arranged for connecting and disconnecting said motor to said electric current source; and
2. an RC time constant circuit electrically connected to an input circuit of said transistor circuit, said time constant circuit being so arranged as to electrically charge electric current in a predetermined time immediately after current from said source is imparted to said electromagnet means, to cause said transistor output circuit to connect said motor to said source when the electric charging is completed, to discharge said charged current likewise in a predetermined time, immediately after the provision of the current from said source to said electromagnet means is interrupted, and to cause said transistor output circuit to disconnect said motor from said source after completion of the electric discharge.

2. A release arrangement according to claim 1, wherein said blocking means includes first and second members, said first member being integrally movable with said shutter means, and said second member being operatively engaged with said electromagnet means, being subjected to the function of said electromagnet means to be selectively shifted into and out of the movable region of said shutter means, and being engaged with said first member, when it is shifted into said movable region.

3. A release arrangement according to claim 2, wherein said electromagnet means includes a yoke for a support thereof, said second member being journalled in the yoke and being disposed adjacent said electromagnet means, and wherein said second member is coupled with a shaft driven by said motor and is formed by a cam having stopper means engageable with said second member.

4. In a motion picture camera, the combination comprising:
1. a rotary shutter;
2. driving means including an electric motor for rotating said shutter;
3. blocking means, a part of which is capable of selectively shifting into and out of the rotational region of said shutter, and which is arranged to be moved from said rotational region to a region located externally of said rotational region;
4. actuating means for imparting operational force to said blocking means for shifting it from said rotational region to the region located externally thereof; and
5. driving circuit means connected to said drive means for driving it electrically, the circuit means including switching means having at least one transistor circuit, and delay means having an RC time constant circuit connected to the input circuit of said transistor circuit, and for delaying the turnover timing of the switching means with respect to operation of said actuating means, said delay means being arranged to respond to a shutter release operation.

5. A motion picture camera according to claim 4, wherein said actuating means is provided with electromagnet means.

6. A motion picture camera according to claim 5, wherein said blocking means includes first and second members, said first member being integrally movable with said shutter means, and said second member being operatively coupled with said electromagnet means, being subjected to the function of said electromagnet means to be selectively shifted into and out of said rotational region, and being engaged with said first member when it is shifted into said rotational region.

7. A release arrangement for a photographic camera comprising:
a mechanical switching means for selectively supplying current to other components of the arrangement from an electric current source;
a motor for operating the camera;
a shutter means operated by the driving force of the motor;
a release means blocking the operation of said shutter means, and including:
1. blocking means for selectively blocking said operation of said shutter means, at least a part thereof being capable of shifting to a first position disposed within the movable region of said shutter means, and to a second position disposed outside said movable region, and being arranged to be moved from said first position to said second position; and
2. an electromagnetic means arranged so as to allow said second blocking member to be disposed outside the movable region of said first blocking member when it receives current supply from said electric source, and also to allow said second blocking member to be disposed within the movable region of said first blocking member when the current supply from said electric source is interrupted, said electromagnetic means being connected to said current source in series with said mechanical switching means; delay means for delaying the timing of current flow through said motor for a predetermined time relative to the timing of the operation of the electromagnetic means, said delay means comprising:
1. an RC time constant circuit circuit means to be charged by electric current, when the current from the power source is supplied by the actuation of said mechanical switching means, and to discharge the previously charged current to said motor circuit, when said mechanical switching means interrupts the current supply; and
2. an electronic switching circuit having a control circuit electrically connected to said RC time constant circuit means, and having a switching path connected in series with said motor and said current source, for control of the starting and stopping of said motor, said switching path permitting electric conduction to said motor after the charging of said time constant circuit means reaches a predetermined voltage level, and interrupting the electric conduction to said motor, when the discharging of said RC time constant circuit means falls below a predetermined voltage level.

8. A release arrangement according to claim 7, wherein said electronic switching circuit is connected with said RC time constant circuit through a resistor.

9. A release arrangement for a photographic camera, comprising:
   switching means for selectively supplying current to other components of the arrangement from an electric current source;
   a motor for operating the camera;
   a shutter means operated by the driving force of the motor;
   a release means blocking the operation of said shutter means, and including:
   1. blocking means for selectively blocking said operation of said shutter means, at least a part thereof being capable of shifting to a first position disposed within the movable region of said shutter means, and to a second position disposed outside said movable region, and being arranged to be moved from said first position to said second position; and
   2. an electromagnet means for controlling the movement of the blocking means, the electromagnet means having at least first and second electromagnet circuits connected for operation individually or in parallel with each other by current from the electric source;
   an electromagnet-circuit control switching means including a first transistor circuit and connected to the electric source for operation in parallel with said first electromagnet circuit and providing a switching path in series with said second electromagnet-circuit, the electromagnet circuit control switching means thereby controlling the current supplied to the second electromagnet circuit;
   a first RC time constant circuit connected to the input circuit of said first transistor circuit and for controlling the current supplying time period of the electromagnet-circuit control switching means, the RC time constant circuit being connected to the electric source in series with the release control switching means for operation in parallel with the first electromagnet circuit; and delay means including a second transistor circuit, the output circuit of which is connected to said motor and to said source, and the input circuit of which includes a second RC time constant circuit for delaying the timing of the activation of the motor for a predetermined time relative to the timing of the actuation of the release control switching means, so as to assure that motor activation cannot precede operation of said actuation means by said electromagnet means.

10. A release arrangement for a motion picture camera capable of taking one-frame phototaking and continuous phototaking, comprising:
   a release control switching means for selectively supplying current to other components of the arrangement from an electric current source;
   a motor for operating the camera;
   a rotary shutter rotated by the driving force of the motor;
   a release means for blocking the rotation of said rotary shutter, said means including:
   1. blocking means, at least a part of which is capable of shifting to a first position disposed within a rotational region of said rotary shutter, and to a second position disposed outside said rotational region, and which is arranged to be moved from said first position to said second position; and
   2. an electromagnet means for controlling the movement of the blocking means, the electromagnet means having at least first and second electromagnet windings connected to the electric current source;
   an electromagnet-circuit control switching means having a first transistor circuit, the output circuit of which is serially interposed between said second electromagnet winding and said source, said first transistor circuit being connected to the electric source for operation in parallel with the first electromagnet winding, said electromagnet-circuit control switching means thereby controlling the current supplied to the second electromagnet winding;
   a first RC time constant circuit connected to the input circuit of said first transistor circuit and for controlling the current supplying time period of said electromagnet-circuit control switching means, said first time constant circuit being connected in series with the release control switching means and the electric source for operation in parallel with the first electromagnet winding;
   mode switching means for selectively switching the camera mode between one-frame phototaking and continuous phototaking, the mode switching means selectively connecting the first electromagnet circuit to the electric source in series with the release control switching means; and
   delay means including a second transistor circuit, the output circuit of which is connected to said motor, and the input circuit of which includes a second RC time constant circuit for delaying for a predetermined time the activation of the motor relative to the release control switching means.

11. A release arrangement according to claim 10, wherein the first electromagnet winding has a smaller internal resistance than the second electromagnet winding.

12. A release arrangement for a motion picture camera having an electric current source, comprising:
   a release control switching means for selectively supplying current to other components of the arrangement from said electric current source;
   a motor for operating the camera;
   a rotary shutter rotated by the driving force of the shutter;
   a release means having:
   1. blocking means including:
      a. a first blocking member fixed to the shutter to be rotated in unison with the shutter; and
      b. a second blocking member for selectively blocking the rotation of the shutter, at least one part of which is capable of shifting to a first position engageable with said first blocking member, and a second position not engageable therewith, and which is arranged to be moved from said first position to said second position; and
   2. an electromagnet means for controlling the movement of the second blocking member, the electromagnet means being connected to the electric source in series with said switching means and having means mechanically linked with the second blocking member for moving the latter by magnetic force;
   delay means electrically coupled with said switching means for delaying the activation and deactivation timing of the motor relatively respectively to the activation and deactivation timing of the electromagnet means, said delay means comprising:

an RC time constant circuit connected to the electric source in series with said switching means, the RC time constant circuit having a charging circuit branch for charging for a predetermined time after the actuation of said switching means and a discharging circuit branch for discharging previously accumulated charge when the switching means is restored to its unoperated position; and an electronic switching circuit including a transistor circuit, the input circuit of which is connected to said RC time constant circuit, and the output circuit of which is connected to said motor, said output circuit permitting connection of said source to said motor when the charging of said RC time constant reaches a predetermined voltage level and interrupting the connection of said source when the discharging of said RC time constant circuit falls below a predetermined voltage level.

* * * * *